(No Model.)

A. W. JOHNSON.
FIFTH WHEEL FOR VEHICLES.

No. 450,911. Patented Apr. 21, 1891.

WITNESSES:
John H. Beemer
E. M. Clark

INVENTOR:
A. W. Johnson
BY
Munn & Co
ATTORNEYS

UNITED STATES PATENT OFFICE.

ALFRED W. JOHNSON, OF NEW BRUNSWICK, NEW JERSEY.

FIFTH-WHEEL FOR VEHICLES.

SPECIFICATION forming part of Letters Patent No. 450,911, dated April 21, 1891.

Application filed September 20, 1890. Serial No. 365,581. (No model.)

*To all whom it may concern:*

Be it known that I, ALFRED W. JOHNSON, of New Brunswick, in the county of Middlesex and State of New Jersey, have invented a new and useful Improvement in Fifth-Wheels for Vehicles, of which the following is a full, clear, and exact description.

This invention relates to fifth-wheels and their connections for wagons and other vehicles, and more particularly to that class of four-wheeled vehicles the front or truck wheels of which are designed to be capable of working wholly under the body of the vehicle when turning the latter.

The invention consists in a special construction of the fifth-wheel and its connections, substantially as hereinafter described, and more particularly pointed out in the claims, whereby not only a king-bolt is dispensed with and the fifth-wheel itself made to form an extended or spread bearing from points at a distance apart on the opposite sides of the draft or center line of the vehicle, but so that on turning the vehicle the half or portion of the fifth-wheel which is attached to the body of the vehicle will be drawn slightly forward and the load on the vehicle with it, and the movable portion of the fifth-wheel will then have an extended circular bearing, the whole arrangement or combination of parts serving to steady the front axle and tongue or thills and largely doing away with that side lurching and thrashing of the tongue or thills so common to king-bolt vehicles, especially in traveling over rough or uneven roads, at the same time providing for the working of the front wheels wholly under the body of the vehicle, if necessary, when turning the vehicle. In this latter respect, as well as in the means provided for attachment of the body of the vehicle to the running-gear of the latter to provide for the draft and turning of the vehicle, the invention which forms the subject of this specification essentially differs from a former invention of mine, described in my application for patent, Serial No. 353,421, allowed July 31, 1890, and which did not admit of working the truck or front wheels under the vehicle when turning the latter.

Reference is to be had to the accompanying drawings, forming a part of this specification, in which similar letters of reference indicate corresponding parts in all the figures.

Figure 1:
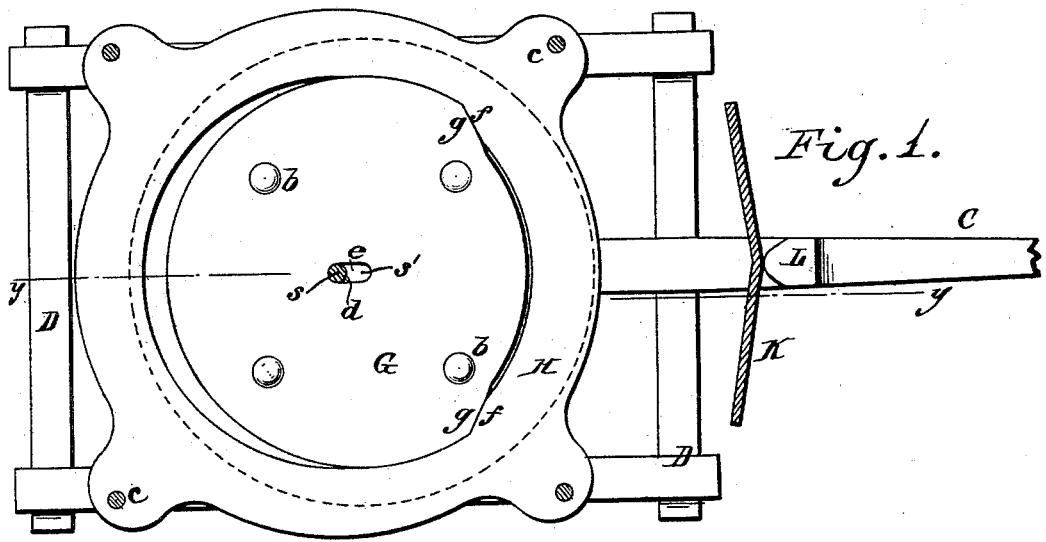
Figure 2:
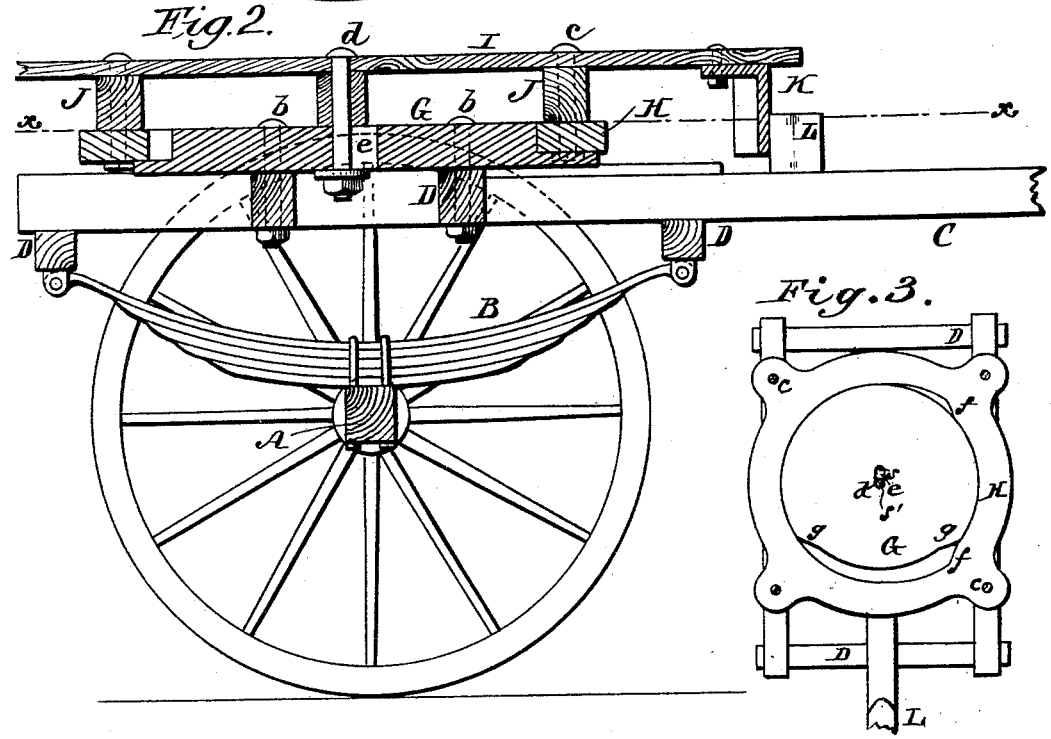
Figure 3:
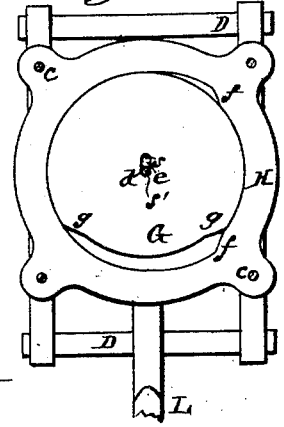

Figure 1 represents a partly-sectional plan view of the fifth-wheel portion of a vehicle embodying my invention, with pole or tongue in part attached in the position which said parts occupy when pulling ahead in a straight line or course, the section being taken on the line $x$ $x$ in Fig. 2. Fig. 2 is a longitudinal sectional elevation of the same, mainly on the line $y$ $y$ in Fig. 1, and showing a portion of the body of the vehicle, its front axle and one of the main springs and a running or front wheel applied; and Fig. 3 is a plan view or diagram showing the position of the fifth-wheel after the truck portion of the vehicle has been turned a quarter or partly round.

The front axle A and each main spring B may be of the usual or any suitable construction.

C indicates the draft-bar, pole, or tongue of the vehicle connected with a suitable frame D, to which each spring B is secured, and which is attached—as, for instance, by bolt $b$—to the rotating half or center portion G of the fifth-wheel proper. The other or upper and stationary portion H of said fifth-wheel—that is, that portion which is attached to the body I of the vehicle—and its frame-work J—as, for instance, by bolts $c$ $c$—receives the rotating half or part G within and beneath it, and the wheel portion G is here represented as being held to the body of the vehicle by a center bolt $d$, about which it is free to turn and to slide in a transverse direction by means of a slot $e$ in it, through which the bolt $d$ passes; but any suitable means may be employed for holding up the wheel portion G to the body of the vehicle with provision for its rotation and transverse sliding movement.

The portion or ring-like section H of the fifth-wheel, which is immovably secured to the body of the vehicle, is mainly of a uniform circular form internally, being struck from a common center $s$, Fig. 1, but deviates from such course in its front part on opposite sides of the longitudinal center line of the vehicle by eccentric curvatures struck as from a center $s'$, terminating in angular shoulders or portions $f$ $f$, where said curvatures join the main internal circular figure of the portion H in front, thus forming opposite set-off side spaces, to which the shoulders $ff$ constitute opposite front side walls.

The rotating or central portion G of the fifth-wheel is of corresponding construction marginally, its front portion being struck as from the center $s$ and its rear part as from the center $s'$, leaving angular shoulders $g\,g$ on opposite sides of the central line of the vehicle in front, which shoulders mesh with or pull against the angular set-off portions or shoulders $ff$ of the piece H when the vehicle is being drawn straight ahead, as shown in Fig. 1, thus giving an extended bearing from points at a distance apart; but the rotating portion G of the fifth-wheel is of lesser diameter or size than the interior of the portion H, so that as the portion G is turned to the right or left its shoulders $g\,g$ will be disengaged from contact with the set-offs or shoulders $ff$, and it will be moved back, or, which is the same thing, the vehicle-body with its load and portion H of the wheel be correspondingly moved forward, the portion G then working in a true circle and having an extended bearing against the main circular walls of the portion H, as shown in Fig. 3.

Attached to the under side of the body of the vehicle in front of the fifth-wheel is a cross-guide and thrust-plate K, having reversely-sloping front sides equivalent to a convex figure, the pitch or rise of which is equal or thereabout to the straight sliding movement of the portion G of the wheel in a transverse direction, and on the pole or tongue C is a block or projection L, arranged to bear against the outer reversely-sloping surfaces of the plate K, so that said plate will receive the thrust of the tongue in backing and while turning the fifth-wheel till the latter at least by its changed position assumes the strain. By this construction or combination of parts the draft-pole or thills cannot move laterally or the truck-axle be turned out of its straight position crosswise of the vehicle when the latter is being drawn ahead without causing the load to be moved forward relatively to the running-gear, which has the rotatable portion of the fifth-wheel attached to it, and both the front or truck axle and tongue or pole will be kept comparatively or perfectly steady.

Having thus fully described my invention, I claim as new and desire to secure by Letters Patent—

1. In a fifth-wheel attachment to vehicles, the draft portion of the running-gear provided with an attached fifth-wheel section or portion mainly of circular contour on its exterior margin, but of eccentric construction on opposite marginal sides in front, thereby forming angular protruding shoulders arranged at a distance apart in front, in combination with an outer internally-circular section or portion immovably attached to the body of the vehicle, having corresponding eccentric set-off spaces and shoulders on opposite internally-marginal sides in front, and adapted to receive the fifth-wheel section attached to the running-gear loosely within it with freedom to turn and to move forward and backward therein, substantially as and for the purposes specified.

2. In a fifth-wheel attachment for vehicles, the combination of the internally-circular or ring-like body section or portion H, having eccentric set-off spaces and angular shoulders $ff$, arranged at a distance apart on opposite sides in front, and the lesser fifth-wheel section G of the running-gear, of like construction externally, but of lesser transverse size, and adapted to admit of the rotation of the one of said sections within or about and backward or forward relatively to the other, essentially as described.

3. The combination, with the body of the vehicle and draft portion of its running-gear and with the shouldered fifth-wheel sections G H, constructed and arranged substantially as described, of the guide and thrust plate K, having reversely-sloping sides in front, connected with the body of the vehicle, and the block or projection L on the draft pole or device of the vehicle, substantially as shown and described.

ALFRED W. JOHNSON.

Witnesses:
FREDERICK WEIGEL,
CLARENCE H. TERHUNE.